Dec. 7, 1926. 1,609,614
G. FAILLA
SYSTEM FOR COLLECTING RADIUM EMANATION
Filed Jan. 24, 1923 2 Sheets-Sheet 1

Inventor
Gioacchino Failla
By his Attorneys
Edwards, Sager & Bower

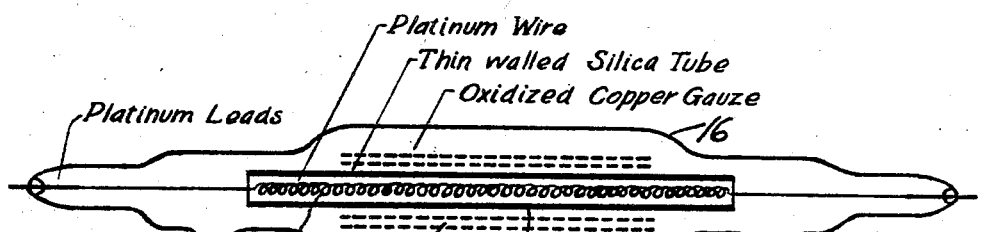
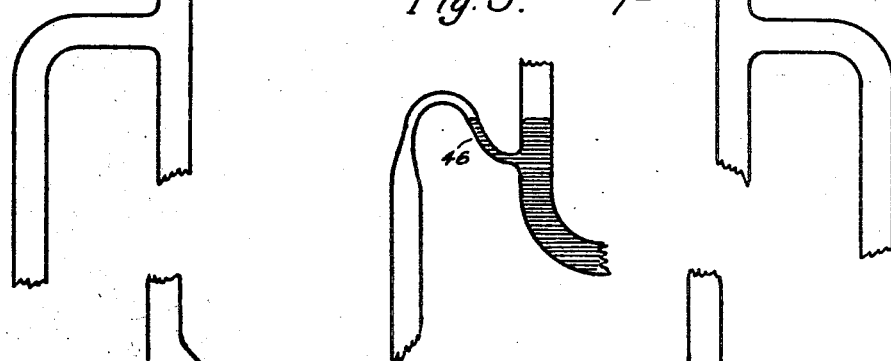
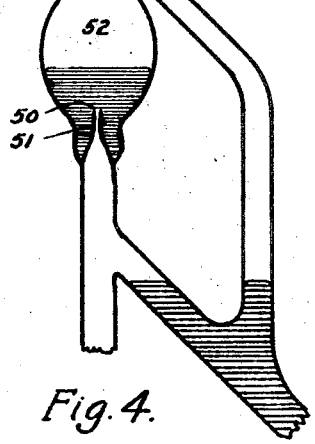
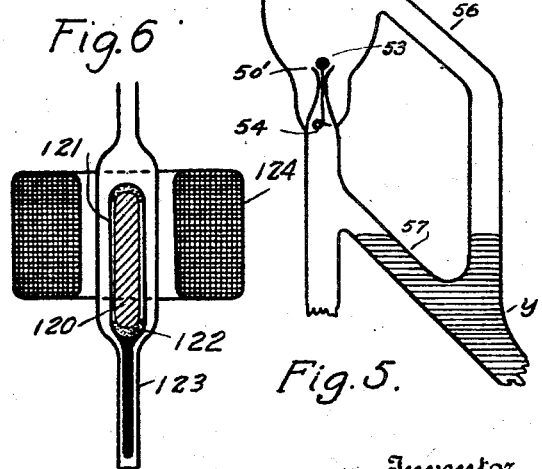

Patented Dec. 7, 1926.

1,609,614

UNITED STATES PATENT OFFICE.

GIOACCHINO FAILLA, OF NEW YORK, N. Y.

SYSTEM FOR COLLECTING RADIUM EMANATION.

Application filed January 24, 1923. Serial No. 614,577.

This invention relates to systems for purifying and collecting radium emanation and the object of the invention is to provide a system in which the various operations required during the transfer of the emanation from the mother flask to the purifying means and from the purifying means to the collecting means will be automatic so as not to depend upon the skill or presence of the operator.

The rays from radium emanation are injurious to the health of a person exposed to their action for a sufficient length of time. While the exposure which the operator gets during prior processes of collection of the emanation is not serious at any one time, if he does this work every day eventually he may be affected. On account of the great penetrating powers of the gamma rays of radium, absolute protection from them by shielding is impossible in practice. A lead plate one half inch thick will absorb only a part of this gamma radiation. Especially where large quantities of radium are used to produce the emanation it is important to enable the technician to remain away from the radium as much as possible.

A further object of the invention is to enable the emanation to be collected early in the day, the purifying and collecting being started early in the morning so as to be ready for final compression in the capillary tubes when the operator arrives in the morning. The emanation may then be permitted to age and its strength determined so that it will be ready for use during the afternoon of the same day. Hitherto the presence of the operator has been necessary throughout the entire collecting operation which therefore could not be begun until after his appearance in the morning and the collected emanation was not ready for use until very late in the afternoon.

In the accompanying drawings

Fig. 2 is a detailed view of one form of heating unit for the purifying system, and Figs. 3, 4, 5 and 6 are views of various forms of gas traps adapted to be used in connection with the collecting means.

Figure 1:
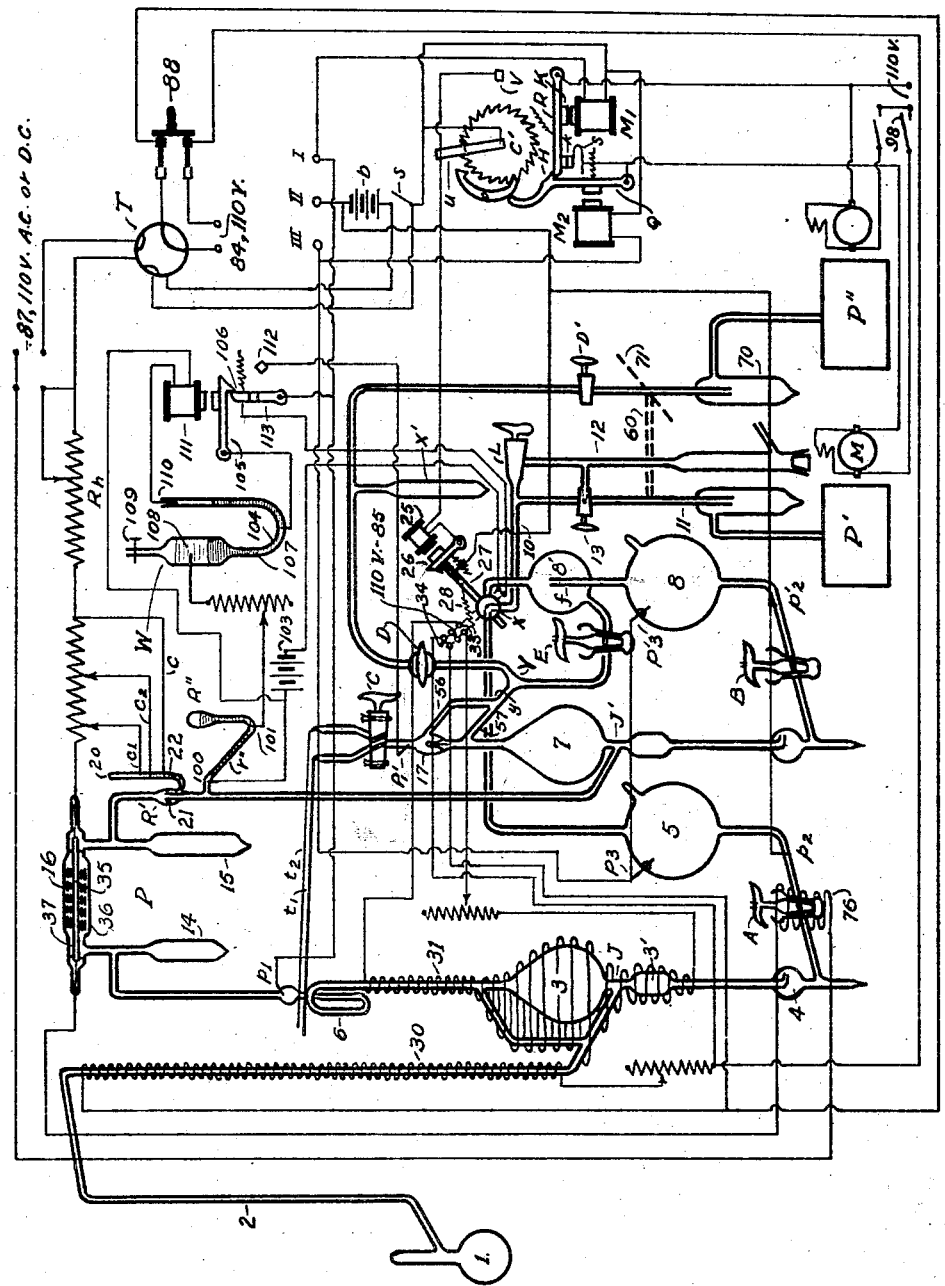
Fig. 1 shows one specific embodiment of the invention in diagrammatic outline.

In the apparatus used to illustrate the invention the radium salt in solution in the flask 1 gives off an emanation which gradually accumulates in the flask and in the tube 2 forming a connection between the flask and the collection apparatus. This emanation initially is mixed with impurities such as water vapor and oxygen and hydrogen which must be removed in order to finally collect the emanation in substantially pure form. The purifying means is shown in outline designated generally by the reference letter P, and the accumulated emanation is transferred to this purifying means P and left there the necessary length of time and is then transferred to the final collecting means adapted to pass it into the capillary tubes $t_1$, $t_2$.

The means for transferring the accumulated emanation from the tube 2 and flask 1 to the purifying means P comprises a mercury pump formed by the bulbs 3 and 5 and the connecting piping shown, and the stopcock A together with means for varying the pressure on the surface of the mercury in the bulb 5, this latter means comprising a connecting piping 10 and connections 11 leading to the vacuum pump P' and the air connection 12. Starting, for instance, with the mercury in bulb 3 and with bulb 5 practically empty the mercury level is drawn down out of bulb 3 by starting the vacuum pump P', and with stopcock 13 turned to connect pipes 10 and 11 and to shut off the connection between pipes 10 and 12, stopcock X being turned so as to connect bulb 5 to tube 10. As the vacuum in bulb 5 is increased the mercury will pass down from bulb 3 to bulb 5 and the impure emanation will diffuse over from the tube 2 into the system of bulb 3. If now the mercury is caused to rise into bulb 3 by admitting air at atmospheric pressure over the surface of the mercury in bulb 5, the diffused emanation in bulb 3 will be trapped and carried upward and as the mercury level passes up through the trap 6 this portion of the emanation will be delivered to the purifying means P. The pressure above the mercury in bulb 5 may be supplied by turning the stopcock 13 so as to shut off the vacuum connection 11 and connect the pipe 10 to the air inlet 12. The mercury is then again withdrawn into the bulb 5 and out of the bulb 3 so that another portion of the accumulated emanation will diffuse into the bulb 3 and this second portion of the emanation is similarly delivered to the purifying means P and so on until the accumulated emanation is substantially all transferred from the tube 2 to the purifying means P.

The emanation is then left in the purifying means P the necessary length of time to thoroughly subject it to the action of the sodium hydroxid in the bulb 14, the phosphorus pentoxid in the tube 15 and the electrically heated copper oxid in the tube 16.

After the emanation has been purified it is transferred from the purifying means P to the collection tube $t_1$, $t_2$, through stopcock C, this collecting means comprising the mercury pump formed by bulbs 7 and 8 and stopcock B connected by stopcock X to the pressure alternating means which cause an alternate raising and lowering of the mercury level above and below the bulb 7 so that successive diffusions of the purified emanation will be trapped in the bulb 7 and pressed up above the trap 17. When substantially all of the purified emanation is passed above the trap 17 the level of the mercury from the bulb 7 is raised up through the stopcock C to compress the emanation into one or both of the capillary tubes $t_1$, $t_2$ which are then cut off in sections by a small flame, these small lengths of capillary tubes containing the emanation being used in the application of the emanation for instance to the affected parts being treated.

The above outlined process of emanation collection requires the presence of the operator at the apparatus practically continuously except during the period of purification and even toward the end of this period if the operator is not present to reduce the current through the copper oxid unit 16 there is danger of this unit burning out due to decreased convection as the emanation being purified is deprived of the various gases which act to carry away the heat from the unit. The result is that this process is attended with some danger that the operator will by repeated exposure day after day finally become affected by the radium radiation. In order to reduce the exposure required of the operator and relieve him for other duties the system of the present invention makes the operations of the apparatus automatic so that the technician is only required to complete the collection of the radium emanation. The operation of collection is automatic and is also begun either automatically or by some attendant, not necessarily a skilled operator, early in the morning; and by the time the operator arrives the accumulated emanation is purified and ready for compression and sealing off in the capillary tubes in which it is used.

The raising and lowering of the mercury levels above and below the bulbs 3 and 7 are made automatic so that the operations of passing the emanation to and from the purifying means do not require the presence of the operator. In order to accomplish this the pump P′ is made of sufficient capacity so that its suction action will not only draw the mercury from bulb 3 but will also and simultaneously exhaust leakage air admitted from the air inlet 12 through the stopcock L set to supply just the right amount of leakage air. If therefore at the end of a given interval the vacuum pump P′ is stopped then this leakage air through stopcock L will supply pressure to the pipe 10 to force the mercury from bulb 5 to bulb 3. Then when the level of the mercury through bulb 3 has been raised to the desired height, for instance, the point $p_1$, a resumption of the operation of the vacuum pump P′ will again create a vacuum in pipe 10 sufficient to draw the mercury from bulb 3 into bulb 5. Thus by alternately stopping and starting the pump P′ the transfer of emanation from the tube 2 to the purifying means P may be accomplished when stopcock A is open and stopcock X is set in the proper position.

The automatic starting and stopping of the pump motor at the proper time can be accomplished easily by means of the electrical circuit and relay shown. $p_1$, $p_2$ and $p_3$ are platinum wires sealed through the glass to make contact with the mercury. It will be seen that when the mercury reaches $p_1$ a current flows through the winding of the electromagnet $M_1$, the power being supplied by the battery $b$, or any suitable source. (When direct current power is available a potentiometer connection is the most satisfactory). The magnet becomes energized and it attracts the soft iron keeper K which carries the arm R. This makes contact with the arm Q and closes the circuit of motor M. As soon as the pump P′ begins to operate the pressure in bulb 5 decreases and the mercury starts to flow into it. Now the mercury no longer makes contact at $p_1$ and the magnet $M_1$ therefore is not energized. But nevertheless the pump circuit remains closed because the hook H holds arm R and arm Q in contact. When the mercury from bulb 3 has been transferred to bulb 5 contact is made at $p_3$, the magnet $M_2$ is energized, arm Q is separated from arm R, and the vacuum pump P′ stops. Then the air leaking through stopcock L builds up a pressure in bulb 5 and the mercury flows back into bulb 3. When it reaches wire $p_1$ the pump starts again and the process is repeated. The relay is provided with carbon contacts $k$ which are adjusted by means of the spring S, to open the pump circuit. In this way no arcing takes place between the brass hook H and the arm R when these separate. The coils of magnets $M_1$ and $M_2$ are wound with fairly large wire and are capable of operating on a low voltage (6 volts.) In this manner when the circuit is broken between a platinum contact and the mercury there is very little arcing. It should be noted that the mercury in bulb 5 should make contact with wire $p_3$ after the mercury level on the other side of stopcock A has reached below the joint J. Since the diameter of the glass tubing ordinarily used is small in comparison to the diameter of the bulb 5 at the contact $p_3$, a relatively large drop of the mercury level in the tube below joint J will result in only a slight rise in the mercury in bulb 5. Accordingly the amount of mercury in the pump system 3—A—5 must be just right. The addition of the tube or bulb 3' of larger cross-section than the rest of the tubing makes this adjustment very simple.

This pumping process can be continued as long as desired or for a definite time by attaching a timer which will open the pump circuit after a predetermined interval or in some way stop the pumping. For instance a counter C' operated by the hook H of the relay may be set so that after a definite number of pumpings, arm U will come in contact with block V thus closing the circuit of solenoid 25. This will magnetize the core and attract the latch 26 and release the bar 27 rigid with the stopcock X so that the spring 28 will turn said stopcock through 90 degrees. This will disconnect bulb 5 from tube 10 and will connect bulb 8 to tube 10. The counter is so adjusted that the stopcock X is not turned until the vacuum pump has stopped and contact at $p_3$ has just been broken. Accordingly the mercury has not had time to reach the joint J and remains mostly in bulb 5 since the air supply has been shut off by the turning of stopcock X. The vacuum pump motor and relay circuits are open and the apparatus can remain in this condition for an indefinite period if desired. At the same time that stopcock X is turned by the operation of solenoid 25, the arm 27 is made to close the circuits of heating coils 30 and 31 which surround the tubing from the radium flask (as shown) and the bulbs 3, 3', trap 6 and the associated tubing in a suitable enclosure (not shown). These heating coils raise the temperature of these parts of the apparatus so that the moisture is vaporized, being driven back and condensed in the flask 1 or the portion of tube 2 just above it. This heating is very important in preventing accumulation and subsequent carrying over of moisture into the purifying system. Such moisture being variable in amount imparts a high variability to the duration and action of the purifying means making it very objectionable in the automatic control of the purifying operation as accomplished by the system of this invention.

Due to the large amounts of hydrogen and oxygen produced by the action of the rays on the water of the solution in the mother flask 1, the volume of the gases passed into the purification chamber is considerable in spite of the reduction of the water content effected by heating of tube 2 and bulb 3. The process of recombination and absorption by the chemicals of necessity requires a certain time. Therefore a pressure of several centimeters of mercury builds up in the purifying system, especially at the first pumping. At this time the temperature of the copper oxid unit 16 drops considerably because the gas surrounding it carries away heat, mainly by convection, the purifying system previously having been exhausted very thoroughly, and the copper oxid unit then heated to redness. The process of recombination of hydrogen and oxygen is slower the lower the temperature of the copper oxid. Hence in order to speed up the purification process it is necessary to keep the copper oxid at red heat. This is done automatically as follows: To the purifying system is added a mercury regulator R'. The platinum contacts $c$, $c_1$, $c_2$ etc. are sealed through the glass tube 20 and are connected with the different taps of a rheostat Rh, which is in series with the heating coil of the copper oxid unit. The voltage required to heat the coil is usually between 20 and 30 volts, so that if direct current at 110 volts is available a rheostat must be used to cut down the voltage to the proper value. In this rheostat may be incorporated the taps corresponding to $c$, $c_1$, $c_2$, etc. If alternating current is available, then it is more economical to use a transformer to reduce the voltage. For the regulator R' in this case a rheostat can be used just as well because the voltage variation from the first to the last tap is only about 10 volts and the waste of power is small. However a transformer with different taps on the secondary winding or an autotransformer can also be used. The number of contacts $c$, $c_1$, $c_2$, etc. can be as large as desired, but in practice two in addition to the common return $c$, are sufficient. The operation of the regulator is obvious from the drawing. When the pressure in the purifying system increases, the mercury 22 rises in the regulator tube 20 and sections of the rheostat are gradually short-circuited, allowing more current to flow through the coil. When the pressure decreases again the reverse process takes place, and there is no likelihood of overheating the coil. The purpose of the bulb 21 in this regulator is to obtain greater motion of mercury in the tube 20 and thus space the platinum contacts more conveniently. The bulb is provided with an overflow tube to facilitate the adjustment of the height of the contacts $c_1$, $c_2$, etc. when the regulator is made. In this manner after the system has been thoroughly exhausted, by proper manipulation of the stopcocks, mercury from bulb 8' can be transferred into bulb 21 and the regulator is ready for operation. If at this time the mercury is raised beyond the bulb 21, and then lowered, the proper amount will be kept in bulb 21 by the overflow tube.

In the process of purification instead of heating an oxidized copper wire coil by passing a current through it as in prior practice a coil of platinum wire or other heat resisting wire 35 is used as the heating element, while a copper gauze 36 wound around a thin quartz tube 37 which houses the platinum helix 35 is used to supply the copper oxid. The platinum wire can be heated to a much higher temperature than the copper wire formerly used, and a gauze 36 supplies a large surface coated with copper oxid. The speed of the purifying process therefore is increased; at the same time the life of the unit 16 is much longer.

In the purifying means the phosphorus pentoxid with which the tube 15 is coated, while very good as a dehydrating agent, can absorb only a small amount of water in a short time. There is always a tendency for water to distill from the radium solution and to collect over the mercury in bulb 3. This is due to two causes: (a) The radium solution in flask 1 is usually surrounded by protective containers and kept in a fireproof safe. For this reason it does not follow readily changes in temperature which occur in the room. Then if the atmosphere becomes colder than the solution, water will distill over and collect on the mercury in tube 2. (b) Each time that the mercury in bulb 3 is lowered below joint J there is a rush of gas and water vapor into the bulb. When the mercury is raised a certain degree of compression occurs and therefore water condenses on the mercury and walls of the bulb. When the mercury is lowered this water does not evaporate entirely because it may be mixed with the mercury, and will accumulate further with additional pumpings. Its presence is not objectionable for that day, because very little, if any goes past the trap 6. However, if the apparatus is allowed to stand the water will gradually collect on top of the mercury in bulb 3 and will cause trouble when pumping the following day. That is, when the pump 3—A—5 is operated to pass the emanation into the purifying system, this water would tend to float on the mercury and would go past the trap 6 if the mercury were raised high enough. The phosphorus pentoxid then would have to absorb this water before the emanation could be passed into the capillary tube. This would prolong the process of purification and would use up the chemical too rapidly. Accordingly in hand operation the height to which the mercury in bulb 3 is raised is carefully controlled by means of stopcock A so that practically all the gas goes past the trap, but very little or no water goes by.

It would be difficult to obtain such a close control with the automatic arrangement described. Furthermore it is best to overcome the trouble at its source. Therefore the distillation of water from the solution which occurs over night (that is, part (a) above) is prevented by surrounding the tube 2 up to the bend with a heating coil 30 which is kept warm all the time except when the emanation is being pumped into the purifier. This heating coil, made of high resistance wire, may be wound on the glass tube itself, or on an additional tube of any suitable material. Thin-walled brass tubing one-half inch in diameter has been found to be very satisfactory. In practice a lead pipe three-fourths inch thick is placed around the heating coil to add to the efficiency of the coil while at the same time increasing the protection of the workers from the injurious rays. The condensation of water in the bulb 3 (that is, part (b) above) should not be prevented because this would decrease the efficiency of the pumping process. The trouble is overcome, however, by the addition of a heating unit around the bulb 3. Its operation is as follows: After having pumped the emanation into the purifying system P the mercury is lowered to a level just below the joint J. Then the heat is turned on both in the coils surrounding the tube 2 and in the chamber around bulb 3. The water will gradually evaporate and will return to the radium flask 1 by condensation beyond the bend. To facilitate the escape of water from the mercury and to increase the speed of evaporation, the mercury may be run into bulb 3 two or three times by the operator if he happens to be present during the time the bulb is being heated. The mercury is raised to the top of the bulb 3 by the operator at the end of the collection process, the bulb heater 31 is turned off by switch 33, and the apparatus is left in good condition for the next pumping. The tube heater 30, on the other hand, is run continuously until the next day or whenever the emanation is to be collected again the source 34 for the current being for instance a 110 volt main. The heating coils 30, 31 may be turned on automatically as already described or by hand.

It should be noted that during the process of evaporating the water in bulb 3 very little emanation collects there. In the first place there is very little of it left in the radium flask and tubing, immediately after the pumping operation. Then the flow of water vapor from bulb 3 toward the radium flask when the heaters are in operation prevents the flow of gas in the opposite direction. In any case, if a small amount of emanation should remain in the bulb after the mercury is finally raised, it will not be lost, but will be collected the next day.

The next step in the process of collection after purification is to transfer the emanation from the purifying system to the passages leading to the capillary tubes. In the automatic operation of the apparatus it is important not to start the pumping process before the emanation has been completely purified. It is always possible to allow more than sufficient time for the purifying process, but this would delay the collection of the emanation unnecessarily. With the arrangement shown diagrammatically at W this is obviated. It will be remembered that when stopcock X was turned by the operation of magnet 25, bulb 8 was connected to tube 10. Since the vacuum pump had been stopped previously by the relay, air filled bulb 8 and the mercury level in bulb 7 rose beyond $p_1'$, stopcock B having been left open by the operator. Now when most of the impurities have been removed from the emanation, the gas pressure in the purifying system P becomes very small. The mercury in the regulator R'' fills the oblique tube $r''$ making contact at 100 and 101 closing the circuit of battery 103 through the U-tube 104 and the contacts 105 and 106 which had been closed by the operator at the start. The U-tube 104 contains mercury 107 and water 108 with a little sulphuric acid. The current which is made to pass through the acidulated water decomposes it into hydrogen and oxygen which collect in the space above, the stopcock 109 having been closed by the operator before leaving the apparatus. This results in an increase in pressure above the water and therefore the mercury in the other leg of the U-tube rises. When the mercury reaches the terminal 110, the circuit of magnet 111 is completed and the arm 106 is released and travels to the stop 112. This opens the circuit of battery 103 at the same time that it connects together the points $p_1'$ and I through contact 112—113. The relay then starts to operate and the pumping operation begins. The purpose of the system W is to start the operation of the relay a definite time (say 10 minutes) after the purification of the emanation is nearly complete. In practice if any serious trouble develops in the purifying system (for instance if no current passes through the coil 35) the pressure of the gases remains fairly high. Therefore the mercury does not make contact at 100 and the emanation is left in the purifier until the operator returns. On the other hand, if the purification has proceeded to such a point that the pressure is low enough for the mercury of R'' to make contact at 100, then it will be only a short time before it is complete. The electrolytic timer 104 takes care of this short interval of time. It can be adjusted to the proper time in several ways, it being possible to move contact 110, to regulate the volume above the water or the current passing through it.

The automatic operation of the pump 7—B—8 is the same as that of 3—A—5 already described. The purified emanation in this case collects over the trap 17. The amount of gas (radium emanation and helium) which is to be pumped into the capillary tubes is very small, and a trap such as that shown at 6 is only adapted for relatively large volumes of gas. Instead of a trap 6 the following types may be used:

(1) *A modification of trap 6, as shown in Figure 3.*—Here the capillary tube 46 must be of very small bore on account of the fact that the amount of gas which is to force the mercury out is very small. Also the trap must be very carefully made to prevent a small bubble of gas from sticking in some irregularity or pocket in the tubing.

(2) *A trap of the form shown in Figure 4.*—The opening 50 of the conical tip 51 must be of such diameter with respect to the capacity of the bulb 52 that some mercury will remain over the opening during the time that the mercury is transferred from bulb 7 to bulb 8 and partly back into 7. That is, mercury must leak through the opening 50 slowly enough to prevent the emanation from getting into bulb 7 before another batch of gas has been drawn from the purifying system. After some mercury has flowed into bulb 7 it does not matter if all the mercury drips out of the trap. In fact, it is better if this happens, because then the passage of the small amount of emanation is not obstructed by any mercury over the opening 50. In practice it is rather difficult to proportion the trap accurately, and for this reason the conical tip 51 is inserted as shown. A mere constriction of the proper size works as well provided no mercury remains over it when the gas is forced through it by the mercury. Otherwise with some mercury in the bulb small bubbles of gas have a tendency to cling to the walls. With the design shown there is no such likelihood because the gas bubbles through the mercury if the height above the opening is not too large.

(3) A trap of the design shown in Figure 5 is easier to make and works very well in practice. It is similar to the one shown in Figure 4 except that the opening 50' is larger and that a platinum ball 53 is used to prevent the mercury from running out. To the ball (which is very small) a platinum wire 54 is attached to keep it over the opening which is flared out a little to provide a better seat for the ball. Since the diameter of the hole 50' can be much larger than the hole 50 in Figure 4, gas and mercury can flow upward through it very freely, but not at all downward. The height of the mercury over the tip is determined by means of a by-pass which will be described later.

(4) *A magnetic trap.*—This can be made with a piece of iron 120 entirely enclosed in a glass plunger 121 which is ground to a seat 122 in the tube 123 over the bulb 7. It can be controlled by a solenoid 124 placed around the tube so that it can be kept closed or open at will as shown in Fig. 6. While this trap presents some advantages, it is rather bulky, and is not so convenient as the one of Figure 5.

The relative position of the trap is shown in Figure 1. The by-pass 56, 57 serves several purposes. (a) It allows the excess mercury to flow back into bulb 7, thus leaving always the same amount in the trap. (b) By lowering the mercury of the by-pass just below the junction $y$ it is possible to transfer the emanation from one capillary tube to the other. (c) By lowering the mercury below the junction Y it is possible to exhaust the capillary tubes by means of the mechanical vacuum pump P″ through stopcocks D, D′ and connecting tubing. This is especially necessary after a new capillary tube has been sealed on. A by-pass is not required with the magnetic trap.

The process of removal of the purified emanation from the purifying means P to the final collecting means having been begun by the automatic timing means W, this process continues indefinitely until the operator comes to the apparatus and stops it for instance by closing the stopcock B or shutting off the vacuum pump P′. All that remains for the operator to do in the process of collection is to compress the purified and collected emanation into the capillary tubes $t_1$, $t_2$, under a pressure which is usually about one half atmospheric. To do this after having closed stopcock B he opens stopcock E so that the mercury in bulb 8′ will be pressed by atmospheric pressure up through to stockcock C and some distance into the tubes $t_1$, $t_2$ depending upon the amount of emanation collected. The portions of these capillary tubes containing the emanation are then cut off by a small flame and the process of collection is complete. While at the apparatus the operator will open the switch 33 to shut off the current through the heating coil 31 while leaving it passing up through the heating coil 30 and he will raise the mercury from bulb 5 up into bulb 3 by admitting pressure to the surface of the mercury in bulb 5. At some convenient time when necessary he will also seal on the new capillary tubes $t_1$, $t_2$ for the next day as above described and will make sure of the vacuum existing in the purifying system P and will leave the system in condition for starting the next morning to collect the next accumulation of the emanation in the tube 2.

The purpose of bulb 8′ is to provide control of the mercury level in by-pass 56—57 and also to enable the operator to compress the emanation in the capillary tube $t_1$ or $t_2$ to a pressure of about one-half atmosphere. The overflow tube $f$ is added to this bulb to make sure that when it is not used it contains always the same amount of mercury. In this manner the amount of mercury in the system 7—B—8 will always be the same, which is essential for its automatic operation.

If the bulb 7, or tubing connected thereto, contains moisture, as soon as the mercury is lowered below the joint J′ water vapor will tend to flow into the purifier P on account of the phosphorus pentoxid which is present there. For if moisture were present the time of pumping allowed for the transfer of emanation from the purifier would not be sufficient to allow all the emanation to come out of the purifier and therefore the yield would be low. To overcome this difficulty the phosphorus pentoxid tube X′ is added to the system. Then when the capillary tubes are sealed in place they are exhausted by means of the mechanical vacuum pump P″ and all the moisture is removed. Moisture is introduced into the system every time that a new capillary tube is sealed on and an ordinary vacuum pump does not pump out water vapor very effectively, though it may pump gases very well. Practically all the troubles encountered in the operation of an apparatus of this type may be traced to the presence of moisture. With the automatic control it is very important that no irregularities should occur. It is for this reason that such great pains are taken to insure freedom from moisture.

The operator will seal the capillary tubes in place and then exhaust the air and moisture from them by lowering the mercury level below the junction $y$ and with stopcocks A and B closed and switch $s$ and stopcocks D and D′ open operating pump P″. When this exhaustion is complete the mercury level will be raised above the trap 17 and stopcocks D, D′ and C closed. These operations may be undertaken at any time convenient to the operator. If it is desired to use only one vacuum pump to operate the mercury pumps 3—A—5 and 7—B—8 and also to exhaust the capillary tubes $t_1$, $t_2$ to a sufficient degree of vacuum, it is only necessary to make a connection such as 60. If for instance pump P′ is to be used then D′ would be connected to P′ through tube 60 and the trap 70 as well as tubing below 71 would not be present.

Before leaving the laboratory for the night, the operator leaves the apparatus in condition to start up and automatically purify and collect the emanation the next morning. The stopcocks A, B and C are open and the stopcocks D, D′ and E are closed while stopcock L is set to desired adjustment, and stopcock 13 is in position to connect pipes 10 and 11. Switch 88 is closed so that the heating coil 30 is in circuit across the line 84 and at the automatic switch T the line 87 and battery $b$ are open circuited so that no current is passing through the heating unit 16 or available for automatic operation of the mercury pumping means. Switch 98 of the motor circuit is closed and the stopcock X is in the position shown in full lines in the drawing connecting bulb 5 with pipe 10, the level of the mercury being above both bulbs 3 and 7. The automatic switch T is timed to automatically shift at a predetermined hour in the morning, preferably before arrival of the operator, and this movement of the switch breaks the connection between the line 84 and the switch 88 so as to shut off current from the heating unit 30. At the same time it completes the circuit of the line 87 and heating unit 16 and heating coil 76, and also completes the short circuiting of the switch $s$ of the circuit to battery $b$. The arm R previously in raised position is therefore drawn downward and the pumping of the accumulated emanation from the tube 2 to the purifying means P begins and is carried on until the arm U of the timer C' moves from its previously set position into contact with the contact point V. This releases the arm 27 so that the stopcock X is shifted to connect tube 10 with bulb 8 and close off the connection between the tube 10 and the bulb 5, this occurring at a time when the mercury level is in the enlargement 3'. The movement of the stopcock X also places the heating coils 30 and 31 in parallel across the supply line 85 and on the other side closes the circuit in the line of the battery 103 of the timer W. The apparatus remains in this condition until after the purification is completed, the timer W causes a re-energization of the vacuum pump motor circuit, whereupon the purified emanation from the purifying means P into the final collecting means begins and continues automatically until the operator arrives at the apparatus to compress the emanation into the capillary tubes $t_1, t_2$.

The operator turns the switch X back to full line position shown and this disengages the heating coils 30 and 31. He also turns the switch T to reconnect the heating coil 30 with the line 84, at the same time disconnecting the heating unit 16 and opening the circuit of the battery $b$. After the cutting off of the capillary tubes and the replacement of the new capillary tubes, the operator returns the apparatus to the condition for automatic starting of the collecting operation the next morning.

The system of this invention thus only requires the presence of the operator at the end of the collecting operation and he is released from constant attention to the apparatus. He is not subjected to the action of the emanation and may spend his time elsewhere while the transferring and purifying actions are being automatically accomplished. By omitting the control W the apparatus can be somewhat simplified and made semi-automatic. The operator will then be required to return to the apparatus to start the pumping operation after the emanation is purified.

It is evident that the automatic operation of the pumping apparatus does not depend upon the particular method of purification of the emanation. The apparatus herein described refers particularly to the chemical method of purification because this is the method used almost exclusively in this country. The system works just as well and is just as desirable with any other method of purification, for instance, the liquid air method. It should also be noted that instead of the adjustable stopcock L, the leakage of air pressure back from the vacuum pump P' when stopped may be relied upon to supply the pressure to the bulbs 5 and 8.

I claim:

1. In a radium emanation collection system the combination with means containing a radium composition and having a space for the accumulation of the radium emanation in a partial vacuum over a relatively long period of time, of purifying means for said emanation, and transfer means adapted to pass the accumulated emanation to said purifying means in a relatively short period of time, said transfer means comprising a variable mercury level withdrawing successive increments of the emanation and transferring them to the purifying means and means automatically responsive to said mercury level controlling said transfer means.

2. In a radium emanation collection system the combination with means containing a radium composition and having a space for the accumulation of the radium emanation in a partial vacuum over a relatively long period of time, of purifying means for said emanation, and transfer means adapted to pass the accumulated emanation to said purifying means in a relatively short period of time said transfer means comprising a variable mercury level withdrawing successive increments of the emanation and transferring them to the purifying means and means automatically responsive to said variable mercury level for controlling said transfer means for a predetermined period of time so that said transfer to said purifying means may be effected in the absence of the operator.

3. In a radium emanation collection system the combination with means containing a radium composition and having a space for the accumulation of the radium emanation in a partial vacuum over a relatively long period of time, of purifying means for said emanation, transfer means adapted to pass the accumulated emanation to said purifying means in a relatively short period of time said transfer means comprising a variable mercury level withdrawing successive increments of the emanation and transferring them to the purifying means, and means for heating said radium emanation collection space to vaporize moisture remaining therein after the transfer of said emanation.

4. In a radium emanation collection system, purifying means, comprising a heated element and means for automatically controlling the heat supply to said element according to the variation of the pressure of the gases in said purifying means.

5. In a radium emanation collection system a purifying means adapted to reduce the pressure as the purification proceeds comprising a heated element and means for reducing the heat supplied to said element in accordance with the reduction of the pressure in the said purifying means.

6. In a radium emanation collection system a purifying means adapted to remove gases from said emanation comprising a heated element and means for increasing the heat supplied to said element in accordance with the increase of the gas pressure in said purifying means.

7. In a radium emanation collection system having means adapted to accumulate the emanation, a purifying means for said emanation having a purifying unit comprising an inner metallic heating element, a surrounding thin walled tube and an outer element chemically reacting with an impurity in the emanation.

8. In a radium emanation collection system having means adapted to accumulate the emanation, a purifying means for said emanation having a purifying unit comprising an inner platinum heating element, a surrounding thin walled tube and an outer element chemically reacting with an impurity in the emanation.

9. In a radium emanation collection system having means adapted to accumulate the emanation, a purifying means for said emanation having a purifying unit comprising an inner metallic heating element, a surrounding thin walled silica tube and an outer element chemically reacting with an impurity in the emanation.

10. In a radium emanation collection system having means adapted to accumulate the emanation, a purifying means for said emanation having a purifying unit comprising an inner metallic heating element, a surrounding thin walled tube and an outer oxidized copper element heated by said inner elements.

11. In a radium emanation collection system the combination with means containing a radium composition and having a space for the accumulation of the radium emanation in a partial vacuum at a comparatively low pressure, of collecting means for said radium emanation and means for pumping said accumulated emanation into said collecting means at relatively higher pressure, said pumping means comprising a variable mercury level and means automatically responsive to said mercury level to control the pumping action so that it may be effected in the absence of the operator.

12. In a radium emanation collection apparatus a purifying means for the emanation comprising a heated unit, and means controlling the heat of said unit according to the pressure of the gas being purified.

13. In a radium emanation collection apparatus the combination with purifying means for the emanation comprising a heated unit, and means for automatically controlling the heat of said unit comprising a variable mercury level controlled by the pressure of the emanation being purified.

14. In a radium emanation collection apparatus a purifying means for the emanation comprising a heated unit and a mercury level control for the heat of said unit, said mercury level being varied by the gas pressure in said purifying means.

15. In a radium emanation collection system the combination with means containing a radium composition and having a space for the accumulation of the radium emanation in a partial vacuum over a relatively long period of time, of purifying means for said emanation, collecting means for said purified emanation, automatic pumping means comprising a variable mercury level for pumping the emanation from the supply to the purifier automatically responsive to said mercury level and automatic pumping means for pumping the purified emanation to the collecting means, said emanation being maintained continuously under pressure less than atmospheric from the supply to the collection means.

16. In a radium emanation collection system the combination with a supply of radium emanation and a purifying means and collecting means, of automatic pumping means comprising a variable mercury level for pumping the emanation from the supply to the purifier, an automatic pumping means comprising a variable mercury level for pumping the purified emanation to the collecting means, at least one of said pumping means having means responsive to the mercury level for automatically stopping it at a predetermined condition of mercury level.

17. In a radium emanation collection system the combination with a heating coil for the supply tube, means for pumping accumulated emanation from the supply tube to a collection means and means for automatically connecting or disconnecting said heating coil during the collection of the radium emanation, said automatic connecting and disconnecting means being controlled by said pumping means.

18. In a radium emanation collection system the combination with a supply tube and a mercury pumping means connecting therewith of heating coils for said supply tube and pumping means, and means for automatically connecting or disconnecting said heating coils during the operation of said system, said automatic connecting and disconnecting means being controlled by said mercury pumping means.

GIOACCHINO FAILLA.